United States Patent Office 3,037,135
Patented May 29, 1962

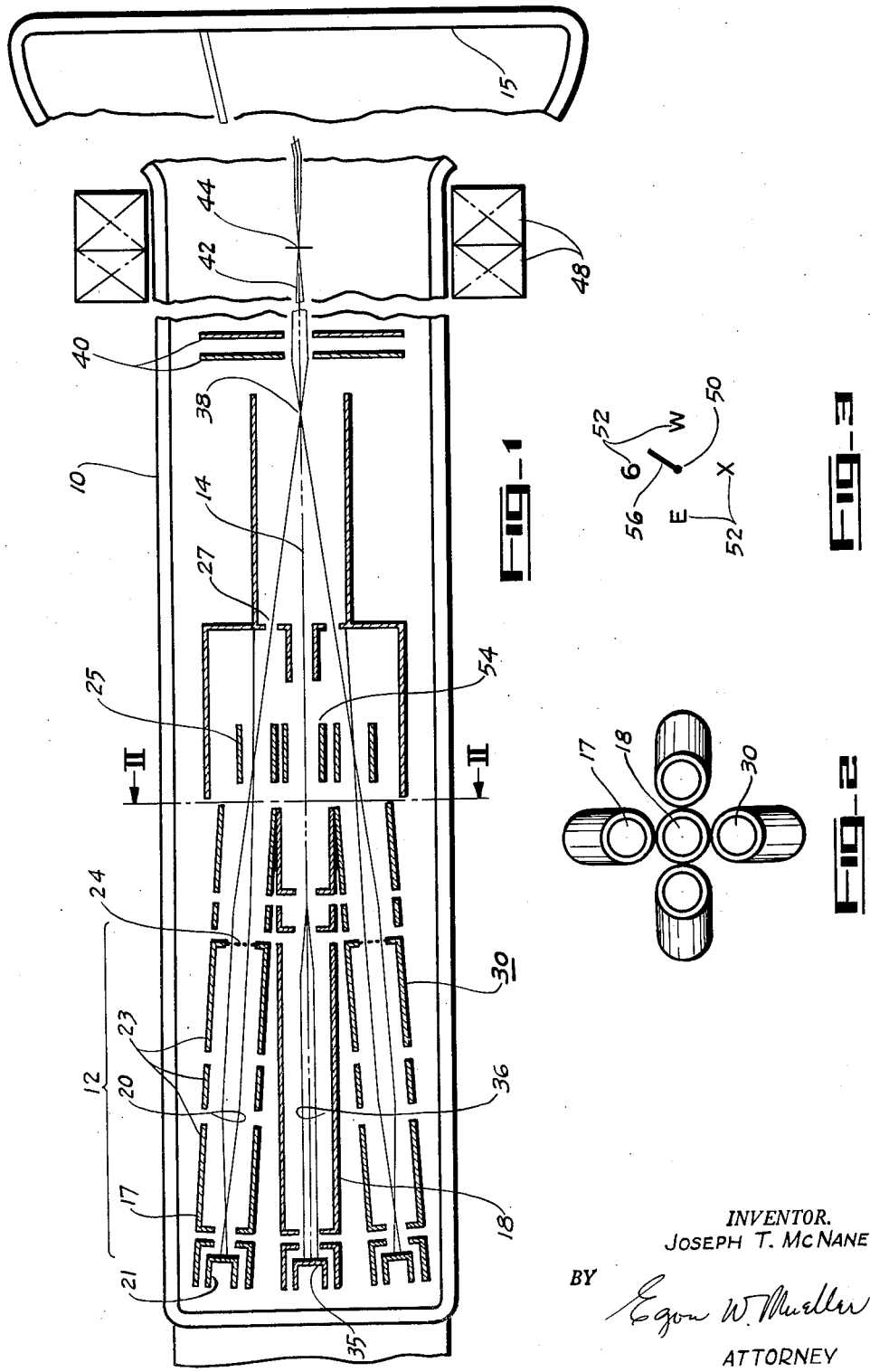

3,037,135
CATHODE RAY TUBE OF DISPLAY TYPE
Joseph T. McNaney, La Mesa, Calif., assignor to General Dynamics Corporation, Rochester, N.Y., a corporation of Delaware
Filed Aug. 5, 1958, Ser. No. 753,323
4 Claims. (Cl. 313—70)

This invention relates to a new and novel cathode ray tube construction for displaying substantially simultaneously radar information, such as targets, along with its corresponding character identification.

Systems utilizing cathode ray tubes of this type of construction, are normally used in the presentation of radar data wherein a plurality of targets may be shown and each of which desirably has identifying characters associated with the applicable target. The target thus identified, may easily be read by an observer. Systems and devices such as these are important in the area of warfare, wherein a variety of radar organizations may be used by a single command to coordinate information and relay it to subordinate commands. They may also be used in such areas as commercial aircraft surveillance, both adjacent airports and enroute surveillance of the aircraft lanes. Examples of such organizations and detailed systems therefore, may be found in "Radar System Engineering," Volume I of the Radiation Laboratory series, McGraw-Hill Book Company, 1947, and as particularly set out in chapters 6 and 7 thereof.

In addition, U.S. Patent No. 2,692,381 of William A. Huber, provides a system wherein a cathode ray tube of normal construction having two normal spot writing guns is employed with one of the guns presenting the radar information, while the other gun may present a programmed simulated target designation from a generator. The present invention may be used with circuitry as amply set forth in accordance with that disclosed in my copending application Serial No. 682,776 filed September 9, 1957, and assigned to the common assignee hereof. Circuitry of that application may, by the elimination of the delay and storage circuits, which according to that disclosure, permit time-sharing of a common cathode ray beam, permit the insertion of the instant cathode ray tube construction to simultaneously present the radar information and the target symbol data adjacent the radar information.

Certain additional circuitry peculiar to operation of shaped beam tube constructions is amply set forth and described in my application Serial No. 340,245 filed March 4, 1953, now U.S. Patent No. 2,850,723, assigned to the common assignee hereof.

In accordance with the present invention, the simultaneous display of radar information as targets and the corresponding character identification of such targets may be presented in a format predetermined by the character of and location of the guns capable of generating the characters. Instead of utilizing the teachings of Serial No. 682,776, it would, of course, be possible to utilize the teachings of Patent No. 2,692,381 to provide a simulator to effect the generation of the intelligible characters, presenting the characters simultaneously with the radar display for viewing on the screen of the tube. While the present invention contemplates preferably placing the spot writing gun on and along the axis to simplify the presentation of radar, as for example in plan position indicator (P.P.I.) displays, it is possible to place the spot writing gun off-axis and still be within the teachings of the present invention. Utilizing, however, the preferred location of the spot writing gun, on and along the axis, there may be nested about the spot writing gun one or more character guns each of which will present, simultaneously with the radar display, a corresponding character identification adjacent the target displayed by the radar display. The character beams will, at all times, be directed to predetermined points upon the screen of the tube in combination with the target or blip of the spot writing beam and therefore no separate or distinct system is necessary to provide the placement of the characters adjacent the target or blip as such blip is generated by the spot writing gun.

In the system as shown in Serial No. 682,776, the proper characters may be selected so that each character gun used will present one character at a predetermined location in a format adjacent the radar target on the screen of the tube. It can therefore be seen that if it is desired to use a plurality of identifying characters with radar targets, that the provision of, or nesting of additional character guns about and adjacent the spot writing gun will permit the addition of one additional character, per character gun used, in each format adjacent each target generated. It can thus be seen that the present invention which may, of course, utilize character guns such as are taught in my Patent Nos. 2,735,956 and 2,761,988, is exceedingly versatile in the number and type of characters that can be utilized and the particular character format to be displayed adjacent the radar target on the screen.

In addition to any of the aforestated objects and advantages, it is an object of the present invention to provide a simple and trouble-free cathode ray tube construction capable of effecting the simultaneous display of radar targets with their character identification.

It is an object of the present invention to provide a simple cathode ray tube construction capable of being used in a system to simply effect simultaneous display comprising radar information and character identification of that radar information.

It is another object of the present invention to provide a cathode ray tube construction wherein a composite electron beam is formed and thereafter controlled as a single beam, the composite beam comprising both radar targets and character information in the form of symbols or letters identifying such targets.

Objects and advantages other than those set forth above will be apparent when read in connection with the accompanying specification and drawings, in which:

FIGURE 1 is a diagrammatic view of a cathode ray tube embodying the inventive construction;
FIGURE 2 is a cross sectional view through line II—II of FIGURE 1;
FIGURE 3 is an exemplary showing of a display upon the face of the tube utilizing 4 character guns and a single spot writing gun.

Referring more particularly to FIGURE 1, there is shown a cathode ray tube construction which exemplifies a preferred embodiment of the instant invention. An evacuated container 10 has positioned at one end thereof a plurality of electron gun assemblies 12 for producing at least a spot writing electron beam, such as is normally used in producing radar target designations in cathode ray tube displays, and, at least one character gun such as exemplified in my Patent Nos. 2,735,956 and 2,761,988 to present appropriate symbolic information adjacent the targets. The resulting electron beams are projected generally along an axis 14 for impingement upon screen 15. Screen 15 may be viewed by a viewer at the exterior thereof seeing the display or targets as light images if the screen 15 utilizes, for instance, the normal phosphor-type construction of cathode ray tube screens.

Electron gun assemblies 12 include, as stated, at least a character gun 17 and a spot writing gun 18. The character gun may be built in accordance with the aforesaid teachings of my Patent Nos. 2,735,956 and 2,761,988 wherein an electron beam 20 is generated by a cathode 21. The electron beam 20 may then be acted upon by electrodes 23 so as to illuminate the openings in beam shaping member 24. The beams so shaped may be crossed over in a deflection means 25 so that a minimal cross sectional area of the composite electron beam 20 is presented to deflection means 25. Deflection means 25 may then be actuated to deflect the composite shaped beam 20 so that a desired symbol, character or numeral shape is selected through aperture 27. Character gun 30 may be of a similar or identical construction to that of gun 17.

The spot writing gun 18 may be made in accordance with well known radar cathode ray tube constructions wherein a cathode 35 projects an electron beam 36 generally along the axis of the gun, which beam is further collimated so as to produce a very small spot of electrons upon the screen 15. As shown in FIGURE 1, the spot writing gun, in order to eliminate complex additional corrective lenses and circuitry, may preferably be placed along the longitudinal axis 14 of the tube 10, projecting its cross sectional spot-size shaped electron beam along that axis for subsequent action thereon as may be desired.

In order to further simplify the construction of the instant invention, the character guns may be nested about and adjacent the spot writing gun. The character guns may be positioned slightly tangentially or obliquely and at an acute angle with respect to the axis of the spot writing gun and the longitudinal axis 14 of the tube, so that the character guns project their respective character shaped beams toward a predetermined point 38, designated a cross over point, upon and along the axis 14. To further simplify the construction, it is desirable that at the predetermined cross over point 38, both the character shaped electron beams and the spot shaped electron beam be at their smallest cross sectional dimension. An electron lens such as disks 40 may then be positioned intermediate the cross over point and the screen 15 at a location predetermined by the size of the format desired upon screen 15. An exemplary format for instance, is set forth in FIGURE 3, which would result from a gun configuration as shown in FIGURE 2. The lens 40 is then caused to act upon the composite electron beam, formed at the cross over point including the character cross section and spot size cross section beams, so as to reimage that composite beam to a subsequent cross over point 44 in the field of influence of a positioned deflection means 48. The positioned deflection means 48 may be electrostatic or electromagnetic, but is preferably shown as electromagnetic and may be of the type so as to control the composite beam 42 in a plan position type indication (P.P.I.) In P.P.I screen displays of data corresponding to the range and azimuth of targe information, it is customary for the beam to sweep radially from the center point of the screen 15 toward the edges thereof and be rotated one step circumferentially at the completion of each sweep producing plan position indication of the targets.

As each target 50 is then displayed upon the screen by the spot writing gun, under the influence of radar circuits such as are exemplified in my Serial No. 682,776 filed September 9, 1957, and for purposes of exemplification assuming the use of 4 character guns positioned about the spot writing gun, each character gun will then display a symbol of information 52 as may be dictated either by signals received from the target (as shown in Serial No. 682,776), or predetermined signals designating a target (as shown in Patent No. 2,692,381).

It should be realized, of course, that lens 40 as well as deflection means 48 may, if desired, be eliminated in order to effect a simple display on the screen. The screen would then be positioned at a point at which the beam having effected its cross over at cross over point 38 expands to a size sufficient or desired to give identifiable target and character designation on a screen 15 thereby dictating the size of the format desired.

The format is dictated solely by the positioning of the character shaped guns which are exemplified at or adjacent the spot writing gun for the display configuration of FIGURE 3. Therefore, if only a single character is desired, only one of the guns need be used, or, if more characters are desired, additional guns may be placed, or, only one of a group of additional guns utilized to get a single character display is so desired. It will, of course, be obvious to one skilled in the art that many such combinations and changes could be made, all still within the scope of the present invention.

As shown in FIGURE 3, the spot writing gun could also be so motivated by its applicable deflection means 54, so as to produce a vector designation 56, giving an indication of the direction as well as the speed of movement of the target 50 shown thereon. The display of information concerning the target occurs substantially simultaneously with the target designation by the spot writing gun. The information and the target then are generated in parallel and not in serial sequence. This being the case, and the formation of the format desired at the display of the characters and the target through the placement or orientation of the guns, it can be seen that the generation and projection of a group of electron beams toward and along an axis cross-over at minimal cross section at the cross over point 38, gives a group of beams which may be treated from thereon as a single beam, simplifying materially the electro-optical system of such tube construction so as to permit simple optics construction thereof. The handling of the composite beam by the same lens 40 and position deflection means 48, permits substantially identical influencing of both the spot writing beam and the character beams so that the composite display will appear as a unity, rather than as separately projected radar and character beams. Any defects or distortions in beam influencing will therefore be minimized and not amplified. This gives the display, shown in FIGURE 3, considerable uniformity to a degree which has not previously existed. The inventive construction also eliminates the necessary memory and display circuits used in time sharing techniques, as well as, separate optics normally necessary to effect such a composite display.

The particular embodiments of the invention illustrated and described herein are illustrative only and the invention includes such other modifications and equivalents as may readily appear to those skilled in the art, within the scope of the appended claims.

I claim:

1. A cathode ray tube for simultaneously displaying radar and character information, comprising: first electron beam producing means at one end of said tube, the longitudinal axis of said first electron beam producing means being coincident with the longitudinal axis of said tube, a plurality of electron beam producing means located at said one end of said tube, each of said plurality of beam producing means being positioned at an oblique angle with respect to said longitudinal axis, said first beam producing means including means to generate a first beam, means to control the intensity of said first beam, and means to focus said first beam as a spot on the screen; each of said plurality of beam producing means including means to generate a beam, a beam-shaping member positioned to intercept said beam and presenting thereto a plurality of character-shaped apertures, whereby a plurality of character-shaped beams are obtained having the shapes of the apertures of said shaping member, and means for selecting a desired one of said character-shaped beams; said oblique angle at which each of said beam producing means of said plurality is located being such that the selected character-shaped beam of each beam producing means of said plurality cross over the longitudinal axis at a first crossover point to thereby form a composite beam with said first beam; means interposed between said first crossover point and said screen for causing said composite beam to cross over at a second crossover point which lies on the longitudinal axis of the tube intermediate said screen and said first crossover point.

2. The combination of claim 1 further including means for deflecting said composite beam to impinge upon any desired spot on the screen, said deflecting means being located so that said second crossover point lies within the field of influence of said deflecting means.

3. The combination of claim 2 in which means for crossing over said composite beam includes lens means interposed between said first and second crossover points.

4. The combination of claim 3 further comprising means for deflecting said first beam prior to its arrival at said first crossover point to thereby give a vector designation without causing a corresponding movement of the character-shaped elements of the composite beam.

References Cited in the file of this patent

UNITED STATES PATENTS

| | | |
|---|---|---|
| 2,457,175 | Parker | Dec. 28, 1948 |
| 2,692,381 | Huber | Oct. 19, 1954 |
| 2,711,493 | Lawrence | June 21, 1955 |
| 2,898,491 | Pearce | Aug. 4, 1959 |

FOREIGN PATENTS

| | | |
|---|---|---|
| 1,141,254 | France | Apr. 29, 1957 |

OTHER REFERENCES

The Type C19K Charactron Tube and Its Application to Aircraft Surveillance Systems, by Joseph T. McNaney, 1955, 15 pp.